July 30, 1963 R. J. MELTZER 3,099,185
CONTOUR PROJECTOR WITH MEANS FOR ADJUSTING THE VIEWING ANGLE
Filed May 19, 1960 2 Sheets-Sheet 1
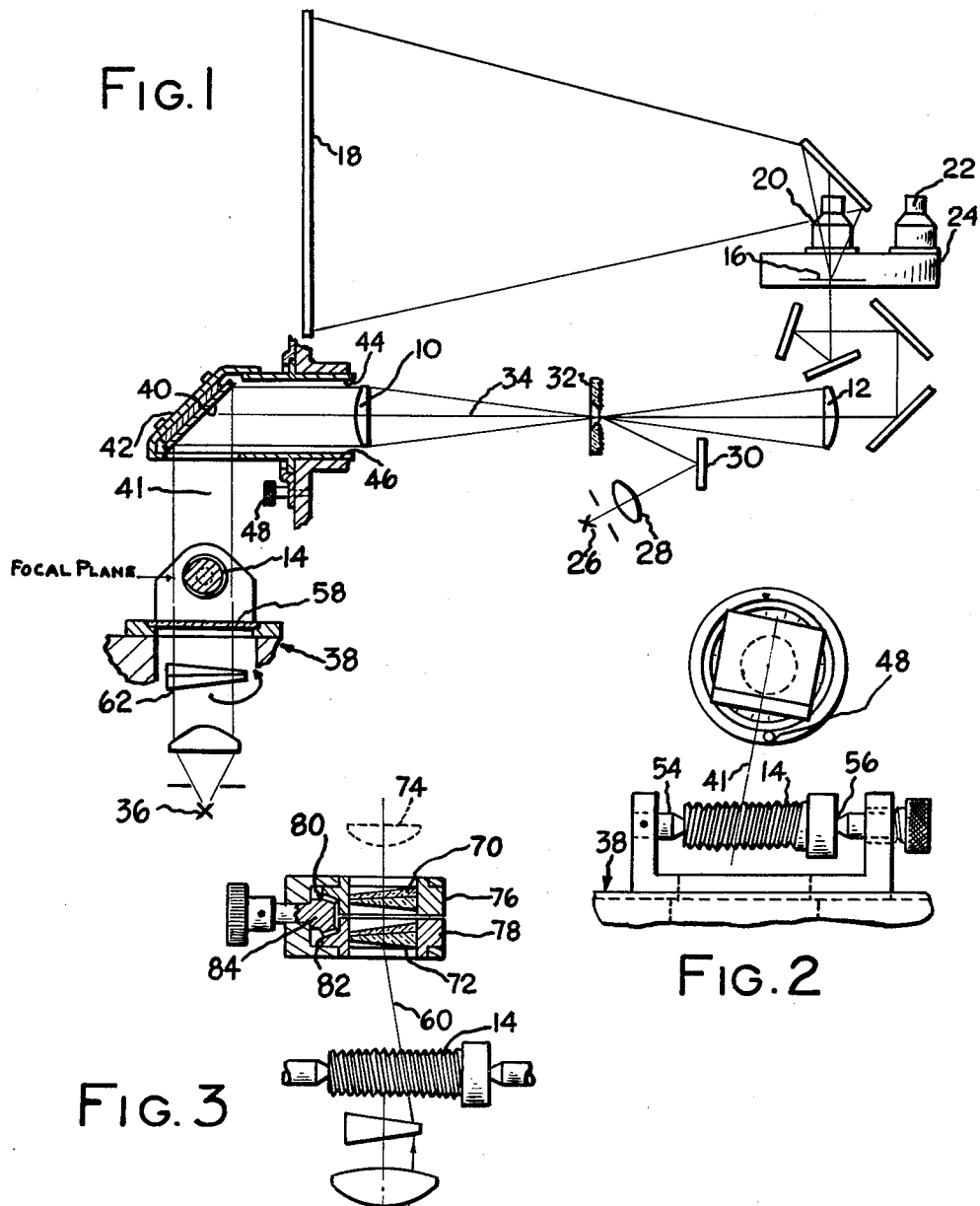
INVENTOR.
ROBERT J. MELTZER
BY
ATTORNEYS July 30, 1963
R. J. MELTZER
3,099,185
CONTOUR PROJECTOR WITH MEANS FOR ADJUSTING THE VIEWING ANGLE
Filed May 19, 1960
2 Sheets-Sheet 2
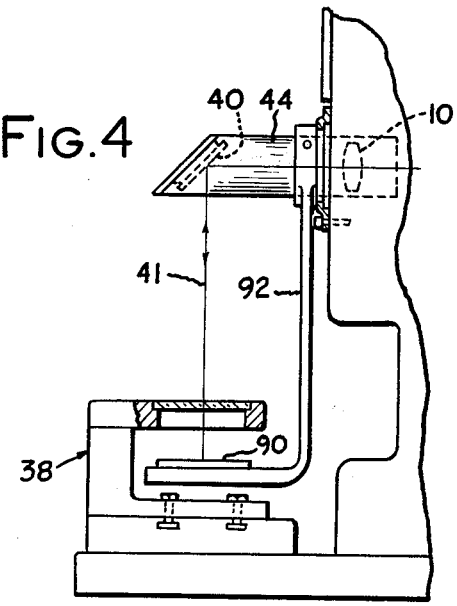
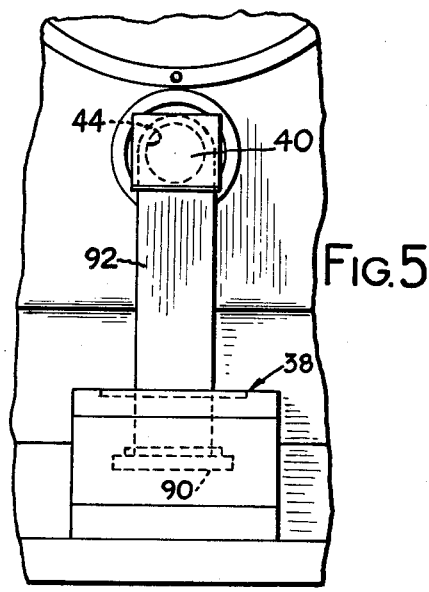
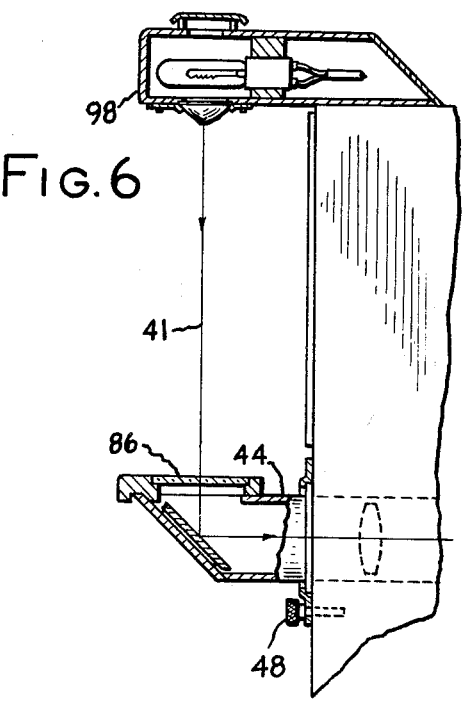
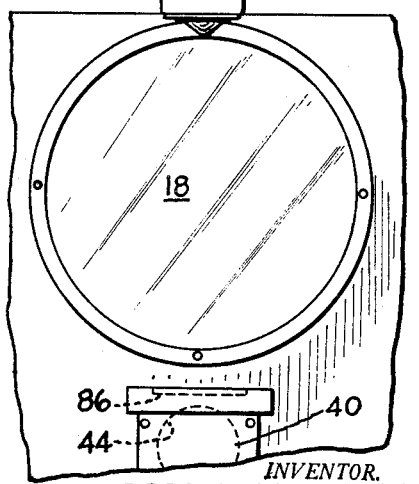
INVENTOR.
ROBERT J. MELTZER
BY
ATTORNEYS United States Patent Office 3,099,185
Patented July 30, 1963

3,099,185
CONTOUR PROJECTOR WITH MEANS FOR ADJUSTING THE VIEWING ANGLE
Robert J. Meltzer, Irondequoit, N.Y., assignor to Bausch & Lomb Incorporated, a corporation of New York
Filed May 19, 1960, Ser. No. 30,282
2 Claims. (Cl. 88—24)

This invention relates to improvements in optical viewing devices, and more particularly, but not necessarily exclusively, to an improved contour projector, or projection microscope including means for varying the direction of the optical axis in the object space in order to adjust the angle at which an object is viewed.

The invention has to do especially with the problem of viewing the profile of an object having a helical configuration, and of taking successive profile views progressively along the length of such an object. In the measurement of screw threads and the like, for example, by optical means, it is desired to view profile images of successive portions of the thread along the length of the screw. For this purpose, the viewing device and the screw must be aligned for each view in such a way that the optical axis of the viewing device is parallel to the screw thread along the line of view. In prior art contour projectors the viewing axis has been fixed, and it has been necessary to mount the stage upon ways, which are in turn mounted on a turntable in order to provide for convenient traverse along the length of a helical profile while maintaining the desired alignment of the optical axis relative to the helix.

Accordingly, one important object of the present invention is to provide an improved optical viewing device including improved means for maintaining a desired alignment of the optical axis in the object space relative to the object to be viewed.

Other objects are: to provide an improved contour projector including means for adjusting the direction of the optical axis in the object space thereby to bring the optical viewing axis into alignment with a desired viewing direction; to provide an improved arrangement of this type in a contour projector, which permits traverse of the profile of an object of helical configuration simply by moving the object in the same direction as required for traversing an object of rectangular configuration; and, in general, to provide an improved arrangement of this character which is relatively simple and inexpensive to manufacture, easy to use, and rugged and long lasting in service.

The foregoing and other objects and advantages of the present invention will become apparent in the following detailed description of a representative embodiment thereof, taken in conjunction with the drawing, wherein:

FIG. 1 is a diagrammatic view of a contour projector including an adjusting arrangement according to a presently preferred embodiment of the invention;

FIG. 2 is a diagrammatic, front elevational view of a portion of the contour projector shown in FIG. 1;

FIG. 3 is a partly diagrammatic, cross sectional view of an alternative arrangement according to the invention for varying the viewing angle of a contour projector;

FIG. 4 is a side elevational view, partly in section, of a contour projector generally similar to the projector illustrated in FIG. 1, but including a modified arrangement for controlling the direction of the light provided for illuminating the object under observation;

FIG. 5 is a front elevational view of the contour projector illustrated in FIG. 4;

FIG. 6 is a side elevational view of the contour projector shown in FIG. 1 as arranged for viewing with its viewing axis directed generally upwardly; and FIG. 7 is a front elevational view of the contour projector as shown in FIG. 6.

Contour projectors are widely used for viewing screw threads and other non-rectilinear surfaces to determine the nature of the profiles and other configurational details of the surfaces. For this purpose, the viewing axis in the object space must be aligned with the surface under observation in such a way that the profile it is desired to observe is not shaded or concealed by parts of the object lying out of the plane of view. With a screw thread, for example, viewing the screw must be arranged with its major axis on a diagonal, or skew direction relative to the viewing axis. When it is desired to traverse a screw in a device of the type in which the viewing axis is fixed, it is necessary to move the screw along such diagonal direction, which travel requires either an arrangement for adjusting the alignment of the ways on which the stage travels, or a great deal of operator inconvenience. Heretofore, the stages of contour projectors intended for such work have usually been mounted upon smoothly adjustable, calibrated turntables, called helix tables, in order to provide adjustment of the direction of travel of the stages. Such helix tables are relatively expensive, since they must be smooth in action and include a precisely controllable drive arrangement.

According to the present invention, means are provided in a contour projector for controllably adjusting the direction of view in the object space, whereby the viewing axis may be aligned in accordance with a desired viewing angle without adjusting the workpiece, and a helical profile may be traversed simply by moving the workpiece perpendicularly to the normal direction of the viewing axis, thus permitting a relatively simple and inexpensive stage construction. Also, in the preferred construction, the viewing axis may be swung full circle, thus permitting viewing in any desired direction according to the convenience of the operator and the type of work at hand.

Referring now to the drawing, the invention is illustrated in FIG. 1 as embodied in a contour projector of the general type described and claimed in my co-pending application, Serial No. 10,790, filed February 24, 1960 now Patent No. 3,064,523. The internal optical system of the contour projector may be of any desired type. As illustrated, it comprises a telecentric afocal relay system including a front objective lens 10 and a rear objective lens 12, which are spaced apart a distance equal to the sum of their focal lengths. The afocal system projects an aerial image of the object 14 being viewed into an image plane 16, which is disposed at a conjugate position relative to a view screen 18, with respect to a projection lens 20. The aerial image is relayed by the projection lens 20 from the image plane 16 to the view screen 18, and may be enlarged to any desired degree depending upon the power of the projection lens 20. If desired, additional projection lens such as the alternate lens 22 may be mounted on a turret 24 together with the lens 20 for alternate insertion into the optical path to provide for various different degrees of magnification according to the requirements of the work and the operator's convenience.

So-called vertical illumination for the object 14 is provided by an internally mounted light source 26. Light from the light source 26 is collimated by a collimating lens 28, and then reflected by a plane mirror 30 to a refractive member 32, which is positioned at the stop of the afocal telecentric system. The refractive member 32 is in the form of a Fresnel prism, and directs the illumination light into paths generally parallel to the internal optical axis 34 of the afocal system. The light thus emerges through the front objective 10 of the afocal system and is directed toward the surface of the workpiece 14 for illuminating it.

Profile illumination is provided by an external light source 36 mounted on the opposite side of the stage 38 from the front objective 10. Further details of the profile illumination arrangement will be described hereinafter.

In the arrangement shown in FIGS. 1 and 2, a mirror 40 is mounted in front of the front objective 10 for directing the optical axis 41 generally downwardly in the object space. Such an arrangement, wherein the mirror is fixed in position is old. According to the invention, however, the mirror 40 is mounted for rotation about the fixed optical axis of the front objective lens 10. As shown, the mirror 40 is secured at the end of a tubular mounting member 44, which is fitted for smooth rotation within an aperture 46 in the face of the projector housing. A thumbscrew arrangement 48 is provided for releasably locking the mounting member 44 against rotation after it has been set to a desired angular position.

The workpiece 14 is illustratively shown as a screw having a helical configuration. For convenience, it may be mounted between centers 54 and 56 above the glass plate 58 of the stage 59, through which the profile illumination is projected. The screw 14 is mounted with its major axis generally horizontal, and for profile viewing of the screw 14, the mirror 40 is rotated to a position where the viewing axis 41 is generally parallel to the direction of the screw thread in the desired plane of view. The screw 14 may be traversed in the ordinary traversing direction, that is along a path perpendicular to the internal viewing axis 34 of the projector for viewing successive portions of its helical profile.

It is also desirable in this type of work to provide maximum illumination. Toward this end, means are provided for directing the profile illumination approximately parallel to the optical viewing axis 41. This is accomplished according to the present invention by providing an adjustable deviating device such as the prism 62 shown, in the path of the profile illuminating light for adjustably changing the angle at which the light from the profile illumination source 36 is directed toward the workpiece 14 and the rotatable mirror 40. The prism 62 is preferably achromatic, and is mounted by any convenient means (not shown) for rotation in a horizontal plane. It is preferably removable to permit proper direction of the illumination when the rotatable mirror 40 is adjusted for normal, vertical viewing.

It is appreciated that rotation of the prism 62 affects the direction of illumination according to a circular pattern, and that as the direction is adjusted to coincide with the tilted viewing axis 41 in one plane it is diverted in the perpendicular plane. This however, has been found to be not particularly objectionable and not to result in appreciable loss of illumination. The arrangement is a relatively simple one, as it provides improved illumination relative to the illumination achieved by vertically directed light in those cases where the optical viewing axis 41 is tilted more than a few degrees away from the vertical.

According to an alternate form of the invention as shown in FIG. 3, the viewing axis 41 of the contour projector may be controllably varied in direction by placing a pair of similar, counter rotatable prisms 70 and 72 in the optical path between the objective 74 of the projector and the workpiece 14. The prisms 70 and 72 are oriented for minimum deviation and are mounted in series along the viewing axis relatively close to the front objective 74 of the contour projector for rotation in opposite angular directions between a position in which they oppose each other and a position in which their deviations are additive.

As shown, each mount 76 and 78 carries an external bevel gear 80 and 82, respectively, which meshes with a third, manually rotatable bevel gear 84.

The degree of angular displacement of the viewing axis 60 achievable in this modification of the invention is limited by the refracting power of the prisms 70 and 72, and in this respect, this modification is not as versatile as the embodiment shown in FIGS. 1 and 2. However, for most practical work, ample deviation of the viewing axis 60 may be achieved using readily available achromatic prisms.

Since the prisms 70 and 72 rotate in opposition to each other, the viewing axis 60 is deviated in only one coordinate direction, the deviation being maximum when the prisms are aligned with their wedge profiles in the same direction, and being minimum when the prisms are aligned with their wedge profiles facing in opposite directions. Any deviation in the perpendicular coordinate direction, that is, in the plane perpindicular to the plane of the drawing, caused by one of the prisms 70 and 72 is compensated for and cancelled out by an equal and opposite deviation effected by the other one of the prisms 70 and 72.

In the alternative arrangement illustrated in FIGS. 4 and 5, a mirror 90 is supported beneath the stage 38 for reflecting the vertical illumination back toward the object being viewed for profile illumination thereof. The mirror 90 is mounted upon the lower end of an arm 92, which is fixed to the rotatable mounting member 44, and is aligned perpendicularly to the viewing axis 41. The mirror 90 may be used in conjunction with the vertical illumination system with the projector to provide profile illumination by reflecting the vertical illumination back toward the object being viewed from the remote side thereof. Since the mirror 90 is always in alignment with the viewing axis 41, regardless of the angular adjustment of the mounting member 44, no separate adjusting means is required in this embodiment for aligning the profile illumination with the viewing axis.

A further advantage of making the mirror mounting member 44 rotatable about the internal optical axis 34 of the projector is illustrated by the arrangement shown in FIGS. 6 and 7. According to this arrangement, the viewing axis 41 is directed vertically upwardly by rotating the mounting member 44 180° from its normal, downwardly looking position. A small auxiliary stage is fitted over the open end of the mount 44 for supporting a workpiece or for serving as a hand rest in the event it is desired to hold the workpiece by hand. A downwardly directed illuminator 98 may be provided for profile illumination of the workpiece in this arrangement, or alternatively, vertical illumination may be used either alone, or in conjunction with the mirror 90.

What is claimed is:

1. A contour projector comprising an optical objective having a fixed optical axis, a mirror positioned in front of said objective on said optical axis and inclined relative to said axis, means rotatably supporting said mirror for rotation about said axis and varying the viewing direction of said objective in the object space, illuminating means radiating a luminous flux for illuminating the object space, alignment means deviating the luminous flux for alignment of the flux with the viewing direction as the viewing direction is varied.

2. A contour projector comprising an optical objective having a fixed optical axis, a mirror positioned in front of said objective on said optical axis and inclined relative to said axis, means rotatably supporting said mirror for rotation about said axis and varying the viewing direction of said objective in the object space, a source of illumination located in front of said objective and spaced farther therefrom than said mirror and than the normal object space, and means controllably concentrating light from said source toward said mirror, and means for varying the direction of light so concentrated so that it may be made generally parallel to said viewing direction.

References Cited in the file of this patent

UNITED STATES PATENTS

| | | |
|---|---|---|
| 829,121 | Neumayer | Aug. 21, 1906 |
| 1,421,057 | Banfield | June 27, 1922 |
| 2,349,989 | Reason | May 30, 1944 |
| 2,358,296 | Baty | Sept. 19, 1944 |
| 2,484,103 | Lewis | Oct. 11, 1949 |